UNITED STATES PATENT OFFICE.

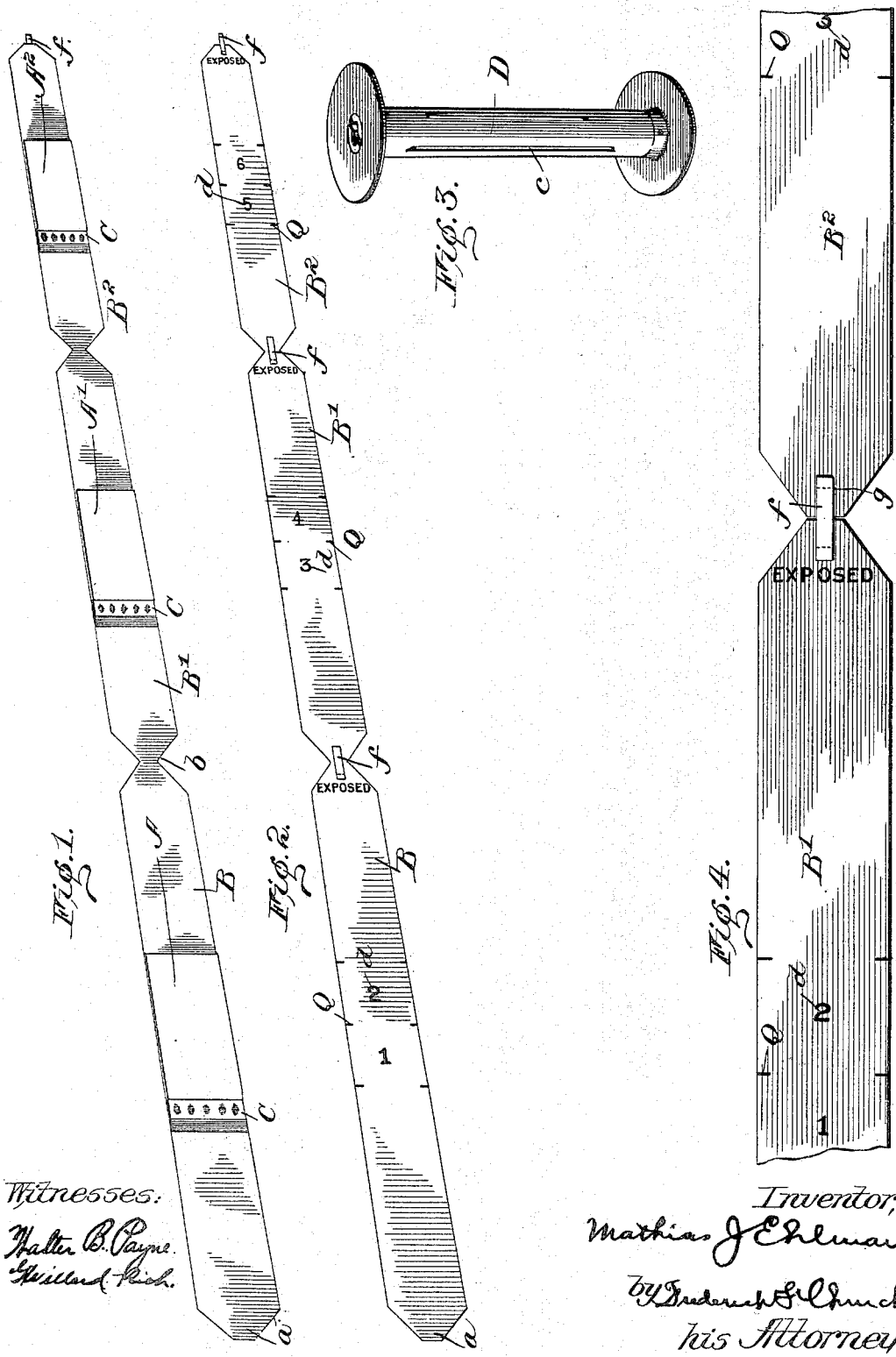

MATHIAS J. EHLMAN, OF ROCHESTER, NEW YORK, ASSIGNOR TO THE EASTMAN KODAK COMPANY, OF SAME PLACE.

PHOTOGRAPHIC-FILM CARTRIDGE.

SPECIFICATION forming part of Letters Patent No. 661,504, dated November 13, 1900.

Application filed September 10, 1900. Serial No. 29,556. (No model.)

*To all whom it may concern:*

Be it known that I, MATHIAS J. EHLMAN, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of this specification, and to the reference-letters marked thereon.

My present invention relates to photographic-film cartridges for use in daylight-loading cameras or roll-holders and embodying a strip of sensitive film and a longer strip of opaque paper containing in its rear side numbers indicating the separate exposures and lines for indicating the points of severance of the film into separate exposures for development. The cartridges or film-rolls placed upon the market heretofore have usually contained film sufficient for twelve exposures, but in one continuous strip, so that after the cartridges or film-rolls had been placed in the camera or roll-holder and one or more exposures had been made it was necessary to expose or at least to round over to the receiving-spool the whole strip before the exposed portion could be removed for development or else to waste a large portion of the film by opening the camera.

My invention therefore has for its object to provide a film-roll or cartridge of such a nature that after making one or any predetermined number of exposures the operator may remove the exposed portions of the film in daylight, if desired, and proceed to expose in the camera the remainder without danger of fogging the exposed or unexposed film, or, if desired, he may wait until all the film has been utilized in making exposures and then remove the cartridge and develop all of it at one operation.

To this end the invention consists in certain improvements hereinafter described, the novel features being pointed out in the claims at the end of this specification.

In the drawings, Figure 1 is a perspective view of a strip of opaque backing or covering material and the film forming the main portion of my improved cartridge. Fig. 2 is a similar view of the rear side of the opaque covering-strip, showing the markings thereon; Fig. 3, a similar view of a cartridge-spool of the ordinary or any preferred construction; Fig. 4, a view of a modification.

Similar reference-letters in the several figures indicate similar parts.

A A' A², &c., indicate strips or pieces of flexible sensitive photographic film, preferably composed of a transparent nitrocellulose base having upon its face a coating of sensitive material, such as gelatino-argentic emulsion, said strips each being of a length sufficient for one or more exposures in the camera or roll-holder for which the film-cartridge is adapted.

B indicates a covering or backing-strip of flexible opaque material, such as heavy black paper, to one side of which the film strips A A' A² are fastened at intervals, being secured at one end only by any suitable fastening means—such, for instance, as pieces of paper C, pasted or glued to the backing B, extending over the perforated or slotted ends of the film strips, and also secured by glue to the backing through the perforations, thereby securing the film in such manner that it is not liable to pull out from the fastening when moved forward in use.

The first film strip A is secured at a sufficient distance from the forward end $a$ of the paper B so as to provide for several convolutions around the complete cartridge to protect it, and also to extend from the supply to the winding-spools in the camera for which the cartridge is adapted, and the distance between the rear end of the strip A and the forward end of the strip A' and the distance between the rear end of each film strip and the forward end of the succeeding strip are approximately twice as great as that described, so that a multiple-film cartridge is formed having a common backing-strip B, of flexible opaque material, to which the film strips are separately applied. The backing-strip B is partially divided or weakened at points about midway between the proximate ends of the film strips, so that the separate strips of film and the backing for them may be divided into separate complete cartridges when used in the manner hereinafter described and the film still be protected from the action of light when applied to or removed from the camera or roll-holder. I prefer to weaken or partially divide the paper backing by forming V-shaped notches *b* at the edges, which not only serve this purpose, but also when the backing is severed leaves tapering ends that may be easily threaded through the slit *c* formed in the spindle of the spool D like the ends *a* of the backing B and form inclined surfaces that are not liable to catch and tear or become folded under when drawn through the camera.

The rear or outer surface of the backing B is provided with suitable numbers *d* and marks Q, as shown in Fig. 2, the former indicating the numbers of the separate exposures of film and the latter the points when the film and paper are to be severed, if it is desired to separate the exposures before development. In the present embodiment of invention I have shown each strip of film of sufficient length for two exposures in a camera or roll-holder of predetermined size, and the indicating numbers of the backing B are therefore "1" and "2" in rear of the first strip A, "3" and "4" in rear of the second strip A', and "5" and "6" in rear of the third strip $A^2$, and so on.

As usual in film-cartridges, the backing B and film are wound together continuously upon the spool, and the full spool is adapted to be placed and centered in the camera or roll-holder and the outer end *a* drawn over the exposing-aperture thereof and attached to an empty winding-spool by passing it through the slit. The operator winds the backing-strip B forward, viewing the numbers through the sight-aperture in the usual manner, and if after having exposed the first film strip A he desires to remove the exposed film for development he stops winding when the weakened portion of the backing or a suitable indicating-mark, such as the word "exposed," is visible through the sight-aperture in the camera. Then by opening the camera or holder he may remove the winding-spool containing the exposed film, which is adequately covered, sever the weakened portion of the backing B, and insert the reduced end of the backing into the slot of another winding-spool and proceed as before. If the user does not desire to remove the separate exposures before exposing all the film strips, he may wind the backing and film forward continuously and determine by the indicating-numbers which portions are being exposed and when he has exposed all of the film in the cartridge.

Cartridges or film-rolls such as I have described are found to be very convenient not only in use, but in making, as the backing being marked and cut properly beforehand the operator is only required to secure the ends of the film strips to it at proper intervals.

Of course instead of forming each film strip for two exposures each one could contain as many as desired, and it is not absolutely necessary, although desirable, that the backing should be weakened at all or in the manner described, although for obvious reasons this is preferable.

The space between the proximate ends of the film strips will of course vary with the length of film required for exposures and the spool between the roll-holding devices, and while under the most favorable conditions with careful manipulation it is only necessary to have a single convolution of the covering-strip around the film before and after exposure I prefer, for safety and in practice, to provide more. Thus I find that with a strip of film approximately ten inches long the covering ends of the backing-strip at the ends of the film should be about twenty inches, although these proportions could be varied, if desired.

While I prefer to wind the film and backing upon the ordinary spools having flanged ends, it is not absolutely necessary that such spools be employed, as the principal object is to carry and protect the film and to enable portions of the whole amount to be removed without exposing the remainder or resorting to a dark room.

In order to facilitate securing the loose end of the backing-strip when a portion containing one or more of the film strips is removed from the camera or holder, I provide small strips *f* of paper containing dried gum secured at one end to the outer side of the backing-strip and extending across the weakened portion, so that when the backing is severed at the weakened line the gum on the strip *f* may be moistened and wrapped around the roll of exposed film, holding the loose or free end of the backing and preventing its unwinding. These strips *f* are wound upon the spools with the backing, and, if desired, the backing-strip might be wholly severed at the weakened portions or two separate backing-strips connected by securing the free ends of the gummed strips *f* thereto, as in Fig. 4, so that if the operator desired to expose only part of the entire roll or cartridge he could sever the said strip *f* near the end of the second backing-strip $B^2$, as indicated at *g*, and then use the remainder of the gummed strip to fasten the free end of the exposed cartridge having the backing B'. In case it is not desired to separate the two backing-strips in the use of the modified construction just described the strip *f* would serve as a connecting means to draw forward the second backing-strip $B^2$ and form, in effect, a continuous backing or covering with the strip B', said strip *f* then forming the weakened portion referred to herein.

I claim as my invention—

1. As an article of manufacture a film-cartridge embodying a backing-strip of flexible opaque material and a plurality of separate strips of flexible photographic film secured thereto at one end only, said strips and backing being wound together into a continuous roll, the extreme ends of the backing beyond the first and last film strips being of sufficient length to cover and protect the film from light when wound into a roll from either end, and the backing between the strips being of sufficient length to cover and protect from light the film on both sides thereof when severed between the proximate ends of the film strips.

2. As an article of manufacture, a film-cartridge embodying a backing-strip of flexible opaque material and a plurality of separate strips of flexible photographic film secured thereto, said film strips and backing being wound together into a continuous roll, the backing-strip extending beyond the outer ends of the first and last film strips, and having partially divided or weakened portions between the proximate ends of the film strips.

3. As an article of manufacture, a film-cartridge embodying a backing-strip of flexible opaque material and a plurality of flexible photographic-film strips secured thereto at intervals, said film strips and backing being wound together into a continuous roll, the backing-strip extending beyond the outer ends of the first and last film strips and having the narrowed severing portions between the proximate ends of the film strips, the length of the backing-strip between the narrowed portions and the proximate ends of the film strips being sufficient to form a protecting-covering for each film strip when wound into a roll with the backing to which it is secured.

4. As an article of manufacture, a film-cartridge embodying a backing-strip of flexible opaque material and a plurality of separate flexible photographic-film strips secured thereto at intervals, said backing-strip having markings on its outer side in rear of the film strips indicating the separate exposures of film, and being weakened or partially divided to form severing portions at intervals between the proximate ends of the film strips, said weakened portions being a sufficient distance from the proximate ends of the film strips to provide several convolutions of the backing around the film strips and backing when wound into a roll together.

5. As an article of manufacture, a film-cartridge embodying a spool having flanged ends, a backing-strip of flexible opaque material and a plurality of separate strips of flexible photographic film secured at one end to the backing-strip at intervals, the backing-strip and film being wound continuously together upon the spool with the film inside, the backing-strip having markings on the rear side in rear of the film indicating the separate exposures thereof, and being weakened or partially divided between the proximate ends of the film strips, and at a sufficient distance from said ends to form a covering for the film strips when wound with their backing into a roll, the extreme ends of the backing beyond the first and last film strips being of sufficient length to cover and protect from light all of the film strips when wound with the backing upon a spool.

6. As an article of manufacture, a film-cartridge embodying a spool, a film backing or covering of flexible opaque material, and a plurality of separate strips of flexible photographic film secured thereto at intervals, the backing being provided with weakened separating portions between the proximate ends of the film strips and a sufficient distance from said ends to form protecting-covering convolutions of the backing around both strips of film to protect them from the action of light when wound into a roll with the backing to which they are attached, and gummed strips attached to the backing on one side of the weakened portions and extending across the latter.

7. As an article of manufacture, a film-cartridge embodying a spool, a backing-strip of flexible opaque paper and a plurality of separate strips of flexible photographic film secured to the backing at the forward ends only and each film strip containing a plurality of exposures, said backing-strip being provided on its outer side with markings corresponding to and indicating the separate exposures of film, the proximate ends of said film strips being separated by a space at least twice as great as the circumference of the spool when the film and backing wound thereon and the extreme ends of the backing-strip extending beyond the outer ends of the film strips a distance at least as great as the circumference of the roll of film and backing when wound upon the spool.

MATHIAS J. EHLMAN.

Witnesses:
G. WILLARD RICH,
WALTER B. PAYNE.